United States Patent [19]

Aulich et al.

[11] 4,061,484
[45] Dec. 6, 1977

[54] PROCESS FOR PRODUCING GRADIENT FIBERS

[75] Inventors: Hubert Aulich, Munich; Josef Grabmaier, Kempfenhausen, both of Germany

[73] Assignee: Siemens Aktiengesellschaft, Berlin & Munich, Germany

[21] Appl. No.: 782,951

[22] Filed: Mar. 30, 1977

[30] Foreign Application Priority Data

Apr. 4, 1976 Germany .............................. 2614631

[51] Int. Cl.² ............................................ C03B 37/00
[52] U.S. Cl. ............................................ 65/2; 65/3 A; 65/13; 65/57; 65/122
[58] Field of Search ................. 65/2, 3 A, 18, DIG. 7, 65/57, 64, 122, DIG. 9, 13

[56] References Cited

U.S. PATENT DOCUMENTS

| | | | |
|---|---|---|---|
| 3,245,770 | 4/1966 | Cortright et al. | 65/122 X |
| 3,498,771 | 3/1970 | Bird et al. | 65/57 X |
| 3,982,916 | 9/1976 | Miller | 65/18 X |

*Primary Examiner*—Robert L. Lindsay, Jr.
*Attorney, Agent, or Firm*—Hill, Gross, Simpson, Van Santen, Steadman, Chiara & Simpson

[57] ABSTRACT

A process for the production of gradient fibers of glass by depositing layers of glasses having selected indices of refraction and then drawing fibers therefrom. The process is carried out by sequentially introducing a plurality of glass masses to form layers having progressively higher refractive index of refractions. The resulting layers are formed into an unitary body which is drawn into an optic fiber.

7 Claims, 3 Drawing Figures

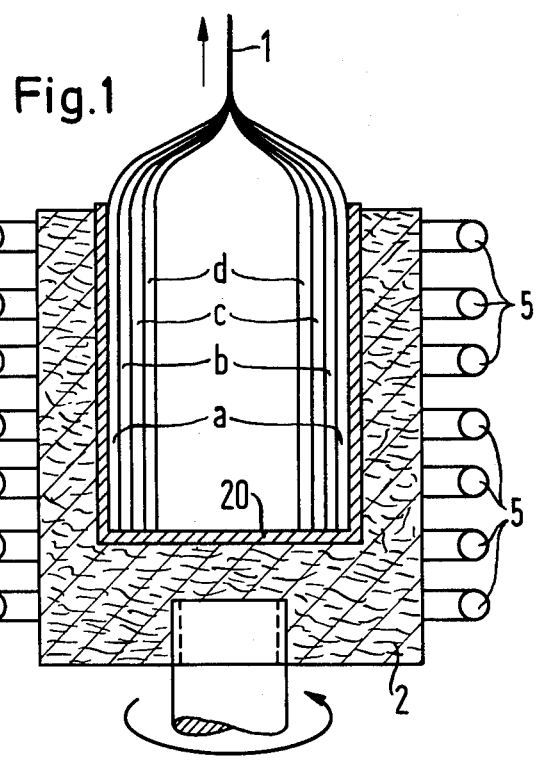
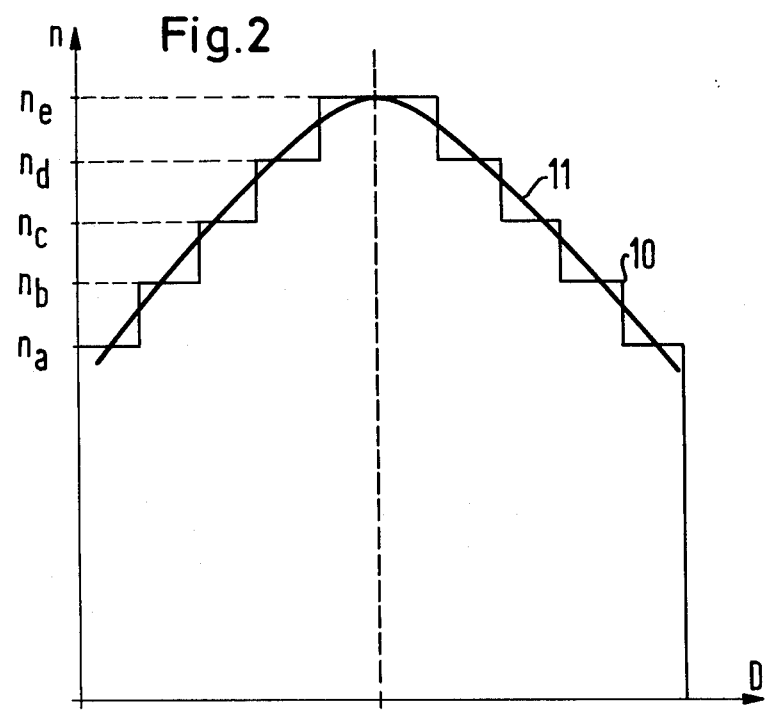

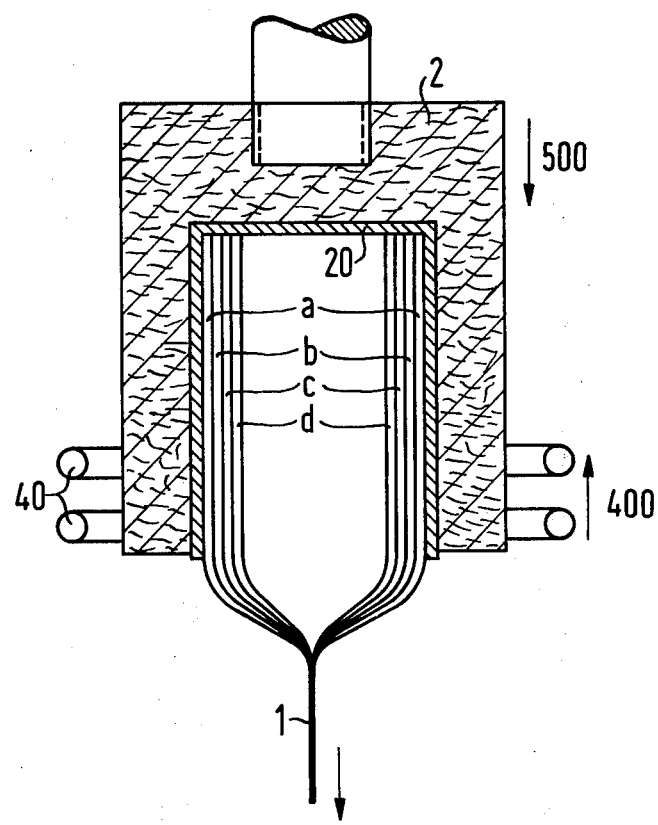

PROCESS FOR PRODUCING GRADIENT FIBERS

BACKGROUND OF THE INVENTION

Light guide fibers having diametrically variable indices of refraction are known. Such fibers have a parabolic curve associated with their indices of refraction. Thus, in the middle of such a light-guide fiber, the refractive index is highest while at the circumferential edge of such a light-guide fiber the refractive index has its lowest value. The production of this type of light-guide fiber has been accomplished previously either by precipitation from a gas phase, such as is described, for example, in the publication by R. D. Maurer, 10th Int. Congr. on Glass, Kyoto, Japan (1974) pp. 59–63, or by an ion exchange process, such as is described, for example, in the publication by J. Kitano, K. Koizumi, H. Matsumura, T. Uchida, M. Furnkawa, Proc. Int. Conf. Solid State Devices, Tokyo, (1969), pp. 63–70.

BRIEF SUMMARY OF THE INVENTION

In the inventive process a rotating, heated melting crucible is utilized, into which glass masses with different refractive indices are introduced successively one after another. As a result of the rotary movement of the crucible, each glass mass is pressed up on the cylindrical walls of the crucible and forms a layer of glass there. The glass layer located on the cylindrical wall is formed by the glass mass introduced first into the crucible, and the innermost glass layer is formed by the glass mass introduced last into the crucible. Thus, on the cylindrical wall of the melting crucible, a glass cylinder is formed, which consists of glass layers each with a different refractive index. A glass fiber is now drawn off from the rotating crucible. Therein, the ratio of the cross sections of the individual layers in the glass fiber corresponds to the ratio of the cross sections of the individual layers in the glass cylinder.

It is a primary object of this invention to provide a new, and particularly simple production process for making gradient glass fibers.

Other and further objects, aims, uses, purposes, features, aspects and the like of the present invention will be appreciated and apparent to those skilled in the art from the present teachings taken with the accompanying drawings.

BRIEF DESCRIPTION OF DRAWINGS

In the drawings:

FIG. 1 is a diagrammatic vertical sectional view through a melting crucible adapted for use in this invention illustrating production of gradient glass fibers by the process of this invention;

FIG. 2 is a plot illustrating the relationship between index of refraction (as ordinates) and hollow glass cylinders wall thickness (as abscissae) for a five-layered cylinder; and FIG. 3 is a diagrammatic vertical sectional view similar to FIG. 1, but illustrating how a solidified layered glass cylindered structure is made molten enabling pulling of a glass fiber therefrom.

DETAILED DESCRIPTION

Referring to FIG. 1, a cylindrically walled rotating melting crucible 20, comprised, for example, of platinum or iridium is utilized. Crucible 20 is enclosed within thermal insulation 2, and crucible 20 is, for example, inductively heated; for this purpose, an induction coil 5 is provided. First, a glass rod which has a refractive index $n_a$ is introduced into the crucible and is made molten by the thermal radiation of the crucible wall. Instead of a glass rod, a liquid glass melt of the corresponding composition can also be poured directly into the rotating crucible. By means of the rapid rotary movement of the crucible, the glass melt is pressed up onto the interior crucible cylindrical walls and forms a glass film-a-there. The thickness of this glass film $a$ depends on the quantity of glass charged. The uniformity or regularity of the thickness is all the greater, the higher the crucible temperature, and higher the rotation speed of the crucible are.

Thereafter, a new and different glass rod having a refractive index $n_b$ is made molten; this rod's refractive index $n_b$ is greater than the refractive index $n_a$. Because of the rotational movement of the crucible, a new glass film $b$ now lays itself smoothly on the already existing glass film "$a$". This operation can be repeated several times according to the refractive index profile desired, so that finally a rotating hollow glass cylinder is formed, whose glass layers $a, b, c, d$, etc. have refractive indices which increase from the crucible wall toward the center, so that the relationship $n_a < n_b < n_c < \ldots < n_N$ is valid. In this connection, N is the total number of the various successive layers of glass.

In FIG. 2, the refractive index pattern or curve 10 of a hollow glass cylinder consisting of five layers is seen. The refractive index "$n$" is plotted on the ordinate; the layer thickness D on the abscissa.

By means of an appropriate temperature selection in the melting crucible 20 and by an appropriate crucible rotation speed, there is achieved, after a period of time, as a result of radial diffusion of the different glass components of the respective glass layers, a continuously varying pattern of refractive index at the interfacial regions between the glass layers, instead of an abrupt refractive index change at such interfacial regions. This continuously varying pattern is represented in curve 11 in FIG. 2.

Thus, a desired refractive index profile is achieved within a glass melt in the crucible 20 by the teachings of this invention.

Now as a next step the melting crucible 20 is brought to a temperature at which glass fibers can be pulled from the hollow glass cylinder formed therein. Then, a glass fiber 1 is formed and pulled directly out of the rotating crucible as shown in FIG. 1 by means of a conventional type pulling mandrel.

If the melting crucible has an axially positioned aperture in its bottom, which is closed during the introduction of the glass cylindrical masses, then it is possible to pull a fiber 1 downwardly out through this hole.

Alternatively, a cylindrical glass mass is cooled in the crucible 20 while the rotation is still in progress and to bring it to solidification; thereafter the melting crucible is inverted, a narrow annular zone adjacent the crucible mouth is heated up, and, when a suitable pulling temperature is reached, a fiber 1 is pulled therefrom (see FIG. 3). By means of a continuous lowering of the crucible, with a stationary heating zone, or, respectively, by means of a continuous raising of the heating zone, the entire glass mass is sequentially brought to pulling temperature, so that it can be progressively pulled. Thus, in FIG. 3, a glass cylindrical mass which has been solidified in the crucible 20 is made molten in an axially narrow region with an induction coil 40, so that a glass fiber 1 can be pulled out therefrom. The melting crucible 20 which has been turned upside down need not be rotated during the pulling. The induction coil 40 is slowly moved axially relative to the crucible 20 corresponding to the arrow direction 400; or, alternatively, the melting crucible 20 is moved relative to the induction coil 40 corresponding to the arrow direction 500.

The pulling of glass fibers can be accomplished in a known manner by means of a conventional pulling drum.

The exact melting and pulling temperatures for a given glass mass in crucible 20 depends on the composition of the glasses utilized; typical temperatures range from about 1000° to 1300° C for the melting of the glasses, and from about 700°–1000° C for the pulling of glass fibers.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

EXAMPLE

Various $SiO_2$-$K_2O$-$Na_2O$ glasses each containing a different quantity of PbO are prepared by melt fusion from highly pure starting materials. The PbO portion of each glass was respectively 33, 36, 39, 42 and 45% on a 100 weight percent total glass weight basis. The individual homogeneous glass melts were poured successively one after another, directly into a rotating melting crucible. In this way a glass cylinder is produced having a refractive index profile generally as shown, in FIG. 2. The value of the refractive index in each glass depends essentially on the PbO concentration therein; in this connection, the refractive index outside was about 1.58, while inside the refractive index was about 1.62.

From this sample embodiment it will be appreciated that the inventive process is especially advantageously practiced using glasses of a kind wherein essentially only one component, such as PbO in this example, or only a few components, of the total glass composition primarily determine the refractive index of an individual glass and wherein these components can be varied over a concentration range. In types of glass such as these the interdiffusion between the interfaces of the various melts in a melting crucible is especially strong, so that the curve of the refractive indices which initially rises stepwise from layer to layer is especially rapidly smoothed by annealing. Thus, the product glass has a refractive index curve which initially has a pattern corresponding to curve 10 in FIG. 2, and, after a short time, a final pattern corresponding to curve 11 in FIG. 2.

However, glasses of various glass systems can also be used; but in this case the chemical, physical and thermal characteristics of the glass systems must be correspondingly matched to one another from a compositional compatibility standpoint.

Other and further embodiments and variations of the present invention will become apparent to those skilled in the art from a reading of the present specification taken together with the drawings and no undue limitations are to be inferred or implied from the present disclosure.

We claim:

1. A process for producing a gradient glass fiber having a changing index of refraction radially comprising the steps of
    A. introducing successively into the rotating, cylindrically-walled heated melting crucible a plurality of glass masses which differ from one another progressively as respects respective indices of refraction thereof, the glass mass introduced initially having the smallest index of refraction of said plurality and the glass mass introduced last having the greatest refractive index of said plurality, so that each individual such glass mass forms a successive cylindrical layer on said cylindrical crucible walls, and
    B. pulling a glass fiber having a radially changing index of refraction from the resulting heated cylindrically layered glass structure.

2. The process of claim 1 wherein said plurality of glass masses is characterized by having the refractive index of each individual glass mass of said plurality be determined by the relative portion of one component thereof, such individual glass masses of said plurality otherwise having similar respective compositions.

3. The process of claim 1 wherein, after step A, said resulting cylindrical layered glass structure in said crucible is solidified while said crucible is so rotating, then an axially narrow annular region of such glass structure is continuously heated to a pulling temperature, and finally a fiber is pulled from the so heated glass structure.

4. The process of claim 1 wherein, after step A, said resulting cylindrical layered glass structure in said crucible is cooled from its formation temperature to a pulling temperature, and then a glass fiber is then pulled directly from said rotating crucible.

5. The process of claim 1 wherein said crucible is comprised of a metal selected from the group consisting of platinum and iridium.

6. The process of claim 1 wherein said crucible is inductively heated.

7. The process of claim 1 wherein the temperature during said introducing ranges from about 1,000° to 1,300° C and wherein the temperature during said pulling ranges from about 700° to 1000° C.

* * * * *